United States Patent
Rogers et al.

(10) Patent No.: US 11,649,915 B2
(45) Date of Patent: May 16, 2023

(54) APPARATUS AND METHOD FOR COUPLING A PLURALITY OF HYDRAULIC VALVES WITH A PLURALITY OF HOSE FITTINGS

(71) Applicant: DEERE & COMPANY, Moline, IL (US)

(72) Inventors: Katherine Rogers, Asbury, IA (US); Charles Clift, Dubuque, IA (US)

(73) Assignee: Deere & Company, Moline, IL (US)

( * ) Notice: Subject to any disclaimer, the term of this patent is extended or adjusted under 35 U.S.C. 154(b) by 713 days.

(21) Appl. No.: 16/596,913

(22) Filed: Oct. 9, 2019

(65) Prior Publication Data

US 2021/0108751 A1    Apr. 15, 2021

(51) Int. Cl.
*F16L 39/00*    (2006.01)
*F16K 27/00*    (2006.01)

(52) U.S. Cl.
CPC ............ *F16L 39/00* (2013.01); *F16K 27/003* (2013.01); *F16L 2201/10* (2013.01); *F16L 2201/60* (2013.01); *Y10T 29/49412* (2015.01)

(58) Field of Classification Search
CPC . F16L 39/00; F16L 39/06; F16L 39/02; F16L 37/56; F16L 41/001; F16L 41/03; F16L 5/14; F16L 2201/10; F16L 2201/60; F16K 27/003; A01B 59/00; Y10T 29/49412
USPC .......................................... 285/24, 27, 124.3
See application file for complete search history.

(56) References Cited

U.S. PATENT DOCUMENTS

| | | | | |
|---|---|---|---|---|
| 2,394,363 | A  * | 2/1946 | Bynoe ...................... | F16L 39/00 |
| 3,516,691 | A  * | 6/1970 | Williams ................ | F16L 39/00 |
| 6,447,023 | B1* | 9/2002 | Grimm ...................... | F16L 5/14 |
| | | | | 285/124.3 |
| 6,607,217 | B2* | 8/2003 | Patterson ................ | F16L 41/03 |
| | | | | 285/124.3 |
| 8,913,866 | B2 | 12/2014 | Cote et al. | |
| 9,720,195 | B2 | 8/2017 | Giraud et al. | |
| 2006/0131874 | A1* | 6/2006 | Frank ...................... | F16L 39/00 |
| 2008/0265571 | A1* | 10/2008 | Gallardo | |
| 2012/0319397 | A1* | 12/2012 | Mahrenholz ............ | F16L 39/00 |
| 2018/0195928 | A1 | 7/2018 | McLaughlin | |

FOREIGN PATENT DOCUMENTS

| | | |
|---|---|---|
| CA | 2241523 A1 | 12/1999 |
| DE | 2516438 A1 | 10/1976 |
| DE | 3141476 A1 | 5/1983 |

(Continued)

OTHER PUBLICATIONS

German Search Report issued in counterpart application No. 102020210911.7 dated May 5, 2021 (10 pages).

*Primary Examiner* — Zachary T Dragicevich
*Assistant Examiner* — William S. Choi

(57) ABSTRACT

A guiding plate for coupling a plurality of hydraulic valves and a plurality of hose fittings which comprises a plate, and an identifying mark. The plate includes a plurality of apertures corresponding to the plurality of hydraulic calve and is positionable over the plurality of hydraulic valves. The identifying mark on the plate for each of the plurality of apertures, the identifying mark indicating the sequence of coupling of each hydraulic valve from the plurality of hydraulic valves with each hose fitting form the plurality of hose fittings.

13 Claims, 4 Drawing Sheets

(56) References Cited

FOREIGN PATENT DOCUMENTS

| | | | | |
|---|---|---|---|---|
| DE | 2701212 C2 | 10/1984 | | |
| DE | 9209060 U1 | 10/1992 | | |
| DE | 4338665 A1 | 10/1994 | | |
| GB | 2320072 A | * 6/1998 | ............. | F16L 39/00 |
| JP | 11125378 A | * 5/1999 | ............. | F16L 39/00 |

* cited by examiner

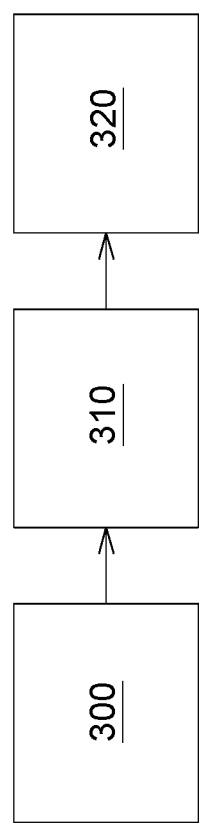

APPARATUS AND METHOD FOR COUPLING A PLURALITY OF HYDRAULIC VALVES WITH A PLURALITY OF HOSE FITTINGS

CROSS-REFERENCE TO RELATED APPLICATIONS

N/A

FIELD OF THE DISCLOSURE

The present disclosure relates to an apparatus and method for coupling a plurality of hydraulic valves with a plurality of hose fittings on a work machine.

BACKGROUND

Work machines such as tractors, skidders, loaders, excavators, and feller bunchers, to name a few, comprise a complex hydraulic network of hose fittings coupled to hydraulic valve to transport hydraulic fluids (e.g. water, diesel, lubricant, coolant) from a first unit to a second unit, wherein units may be reservoirs and actuators. Hydraulic hoses in work machines encounter extreme pressure differentials because of large loads on the work machine, while subject to large temperature variations depending on the local regional weather. These extreme conditions require that the hoses be installed with precision and accuracy. Errors during the manufacturing installation process and the maintenance procedures may lead to premature failure. Current methods addressing quality control in this manual process include labeling the hoses directly and applying colored discs as a ringlet around a hose. However, each of those approaches add components to the assembly, steps to the assembly process, and result in overall increased costs and increased manufacture time.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure substantially improves the assembly process by streamlining the process through an apparatus and method. Furthermore, the apparatus advantageously remains on the work machine post assembly, thereby guiding service technicians of the work machine through maintenance (e.g. valve, hose fitting or hose replacement) with ease.

A guiding plate for coupling a plurality of hydraulic valves and a plurality of hose fittings which comprises a plate, and an identifying mark. The plate includes a plurality of apertures corresponding to the plurality of hydraulic calve and is positionable over the plurality of hydraulic valves. The identifying mark on the plate for each of the plurality of apertures, the identifying mark indicating the sequence of coupling of each hydraulic valve from the plurality of hydraulic valves with each hose fitting form the plurality of hose fittings.

The guiding plate may further comprise an orientation indent on a perimeter of the plate. The orientation indent may limit the orientation of the plate positioning over the plurality of hydraulic valves.

The plate may further comprise a notch for each aperture from the plurality of apertures wherein the notch may indicate the direction each hose fitting is oriented.

The plurality of apertures may be different in size from a second aperture from the plurality of apertures.

The guiding plate may be a single piece component. This guiding plate may be manufactured through one or more of sheet stamping, single-piece injection molding, and machining.

The method of coupling a plurality of hydraulic valves with a plurality of hose fittings using a guiding plate may include providing a guiding plate with a plurality of apertures corresponding to the plurality of hose fittings as a first step. In a next step, the guiding plate is oriented to align with the plurality of hydraulic valves. In another step, the guiding plate is positioned over the plurality of hydraulic valve, and finally coupled to the plurality of hose fittings with the plurality of hydraulic valves.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which:

FIG. 4 is a method of coupling a plurality of hydraulic valves with a plurality of hose fittings using a guiding plate.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

Figure 1:
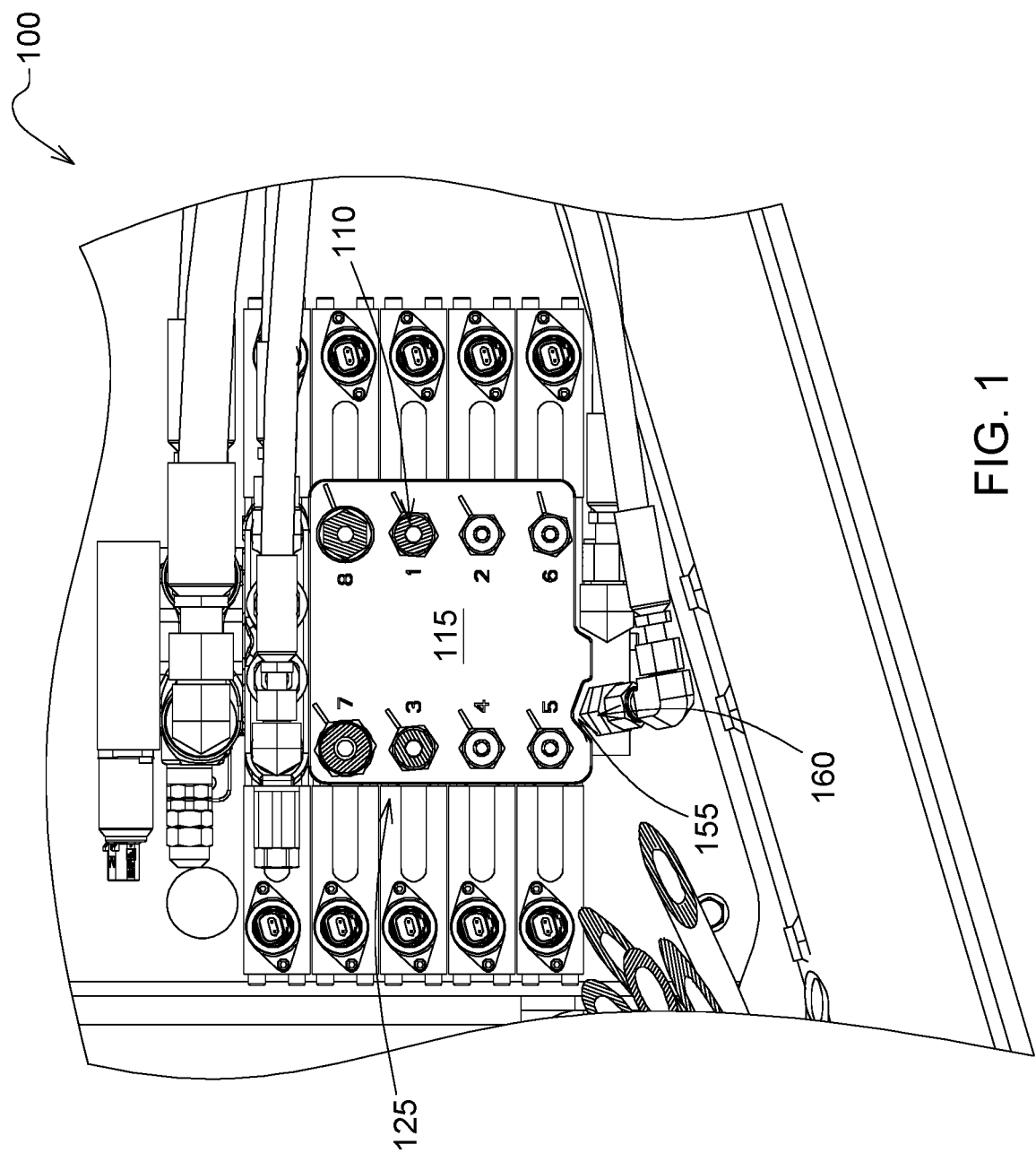
FIG. 1 is a top view of a first embodiment of a guiding plate positioned on a portion of a work machine.
Figure 2:
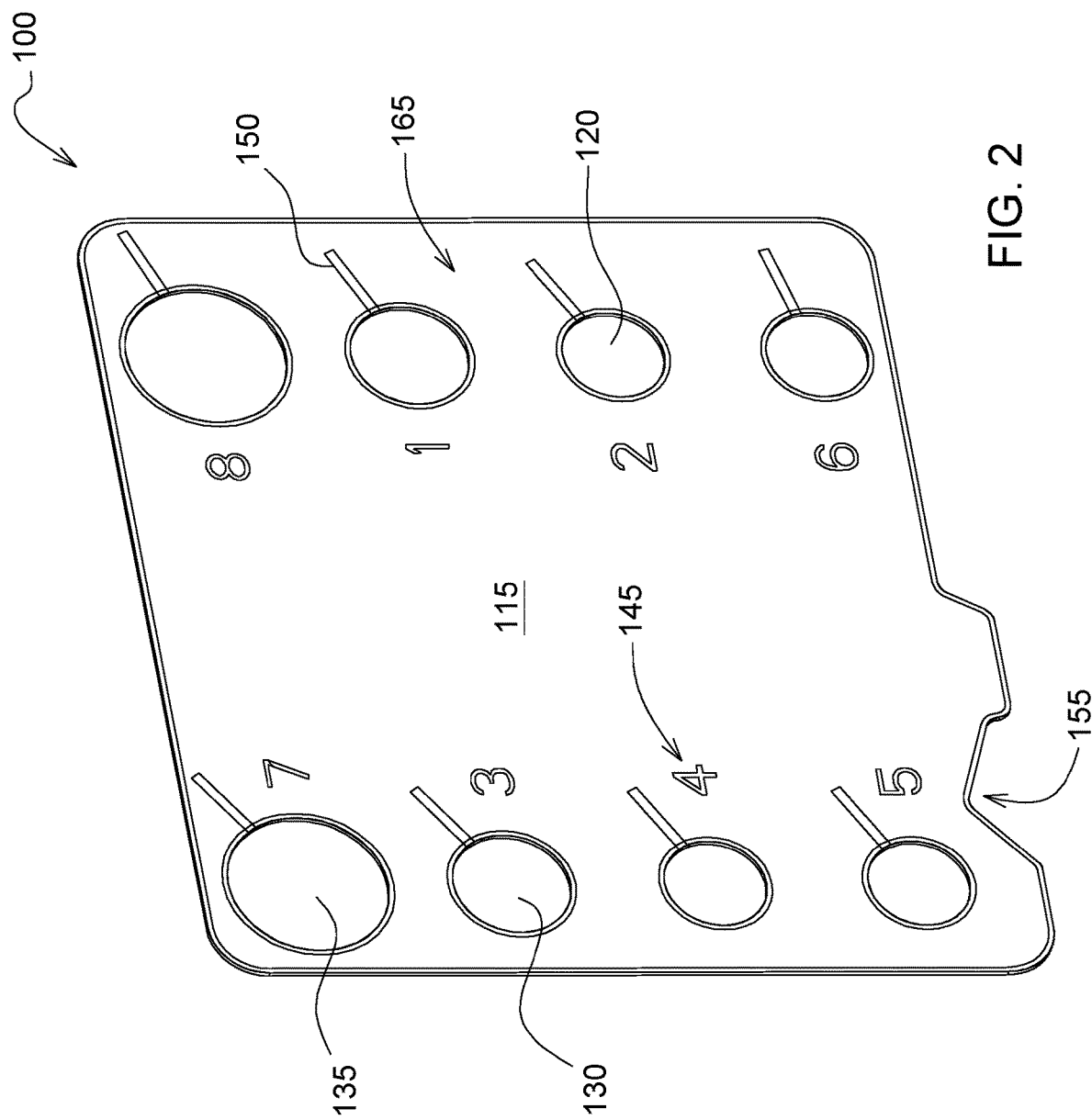
FIG. 2 is a perspective view of a first embodiment of a guiding plate.
Figure 3:
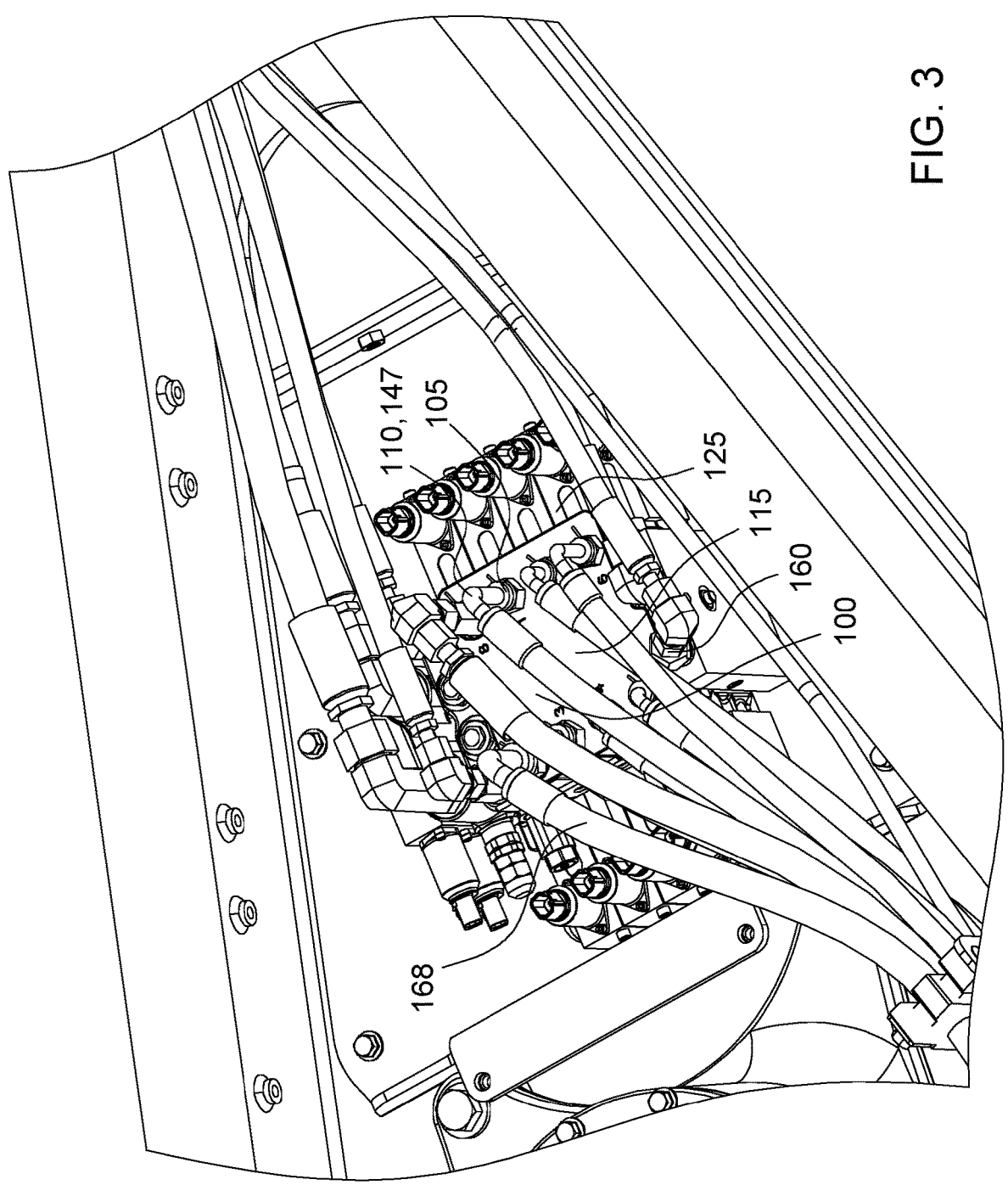
FIG. 3 is a perspective view of a guiding plate as part of an assembly on a portion of a work machine.

FIGS. 1 through 3 illustrate a guiding plate 100 for coupling a plurality of hydraulic valves 105 with a plurality of hose fittings 110.

The guiding plate 100 may comprise of a plate 115 with a plurality of apertures 120 corresponding to the plurality of hydraulic valves 105. Customized to the area of application or the type of work machine, the plurality of apertures 120 on the plate 115 may correspond to the plurality of hydraulic valves 105 protruding from a unit 125 (e.g. a reservoir, implement, or actuator). The plate 115 may be positionable over the plurality of hydraulic valves 105, wherein each of the plurality of apertures 120 is sufficiently large in size to slip over the respective hydraulic valve 105. In one embodiment, the apertures 120 may be uniform in size to be applicable to a large number of work machine applications. In the embodiment shown, the apertures 120 may vary in size, thereby serving as indicator in orienting the guiding plate 100 for positioning over the hydraulic valves 105 while maximizing the surface area on the plate for installation instructions, care instructions, warnings, or model number. That is, a first aperture 130 from the plurality of apertures 120 may be different in size or shape from a second aperture 135 from the plurality of apertures 120. The guiding plate 100 may comprise of a thin, rigid or semi-rigid material (e.g. polymer, sheet metal, rubber) because spaces in hydraulic systems in work machines can be narrow and tight. Furthermore, potential interference with any hose assembly may be minimized. The guiding plate 100 may be floating once positioned over the hydraulic valves 105. Alternatively, the guiding plate 100 may be secured to a surface 140 of the unit 125 through an adhesive, a velcro, hardware, clip, or alternative similar means. The guiding plate 100 may be detachable or affixed to a surface 140 of the unit 125 once positioned over the hydraulic valves 105.

The guiding plate 100 may further comprise an identifying mark 145 for each of the plurality of apertures 120. The identifying mark 145 may indicate the sequence of coupling of each hydraulic valve from the plurality of hydraulic valves 105 with each hose fitting from the plurality of hose fittings 110. Proper installation of hoses 168 (which is coupled to the plurality of hose fittings 110) requires following several parameters to avoid premature failure. Premature failure may include cracking or splitting, pin hole leaks, and improper hose length. A first parameter includes avoiding taut hoses. Even where hose ends do not move in relation to each other, taut hoses tend to bulge and weaken under pressure. Allowing some slack to prevent strain avoids this issue. Thereby maintaining the correct hose length addresses this issue. The identifying marks 145 advantageously allow for correct sequencing of assembly hose wherein the hoses overlap one another in a specific orientation.

A second parameter is avoiding loops. Use of elbow fittings 147 to prevent long loops cuts down the length of hose installation and presents a neater installation. To ensure hose routings are of the correct length, the orientation of the elbow fitting 147 relative to the hydraulic valve in the assembly must be precise (i.e. within a few degrees) as prescribed in the assembly procedure. To address this issue, the guiding plate 100 may further comprise a notch 150 (one of several identified) for each aperture from the plurality of apertures 120. The notch 150 advantageously indicates the direction each hose fitting 110 must be oriented for optimal function. Tolerance values for hose fitting 110 orientation may be as small as four degrees. For example, tightening the hose fitting at 22 degrees instead of a desired 27 degrees could yield in premature failure. The notches 150 on the guiding plate 100 easily address this issue by providing clear visual indicators in proximity to the plurality of apertures 120. Furthermore, this feature may be particularly applicable to elbow hose fittings 147 wherein the hose hitting comprises a 90 degree bend.

A third parameter to avoid premature failure is avoiding twisting. Hoses may be weakened and hose fittings may be loosened by twisting either during installation or machine operation. Finally, avoiding sharp bends when coupling hose fittings to hydraulic valves 105 minimizes premature failure. The bend radius generally depends on hose construction, size, and pressure. For example, a hose 168 generally enduring low pressures may permit a tighter bend. Whereas, hoses subject to high pressures may require a larger radius to endure the large pressure fluctuations. Each of these parameters are addressed with ease and minimal costs by use of the guiding plate 100 while simultaneously expediting the assembly process. The single step process of positioning the guiding plate 100 on the plurality of hydraulic valves 105, wherein the guiding plate 100 readily identifies the sequence of hose assembly through identifying marks 145 (i.e. the hose fitting to the hydraulic valve), and furthermore denotes the orientation of each respective hose fitting with notches 150, eliminates the need to apply labels, and the need for the technician to repeatedly shift their gaze between assembly instructions in a manual and the hose assembly.

In order to further assist in positioning of the guiding plate 100, the guiding plate may further comprise an orientation indent 155 on a perimeter of the guiding plate 100. The orientation indent 155 may limit the orientation of the guiding plate 100 as it is positioned over the plurality of hydraulic valves 105. That is the orientation indent 155 may be an easier identifier for the plate to couple with a protrusion 160 from the surface 140 of a unit 125 such as a reservoir, implement, or actuator). The protrusion 160 may be a hydraulic valve from the plurality of valves 105, a hardware piece, or a part of the shape of the unit 125 itself.

Each aperture from plurality of apertures 120 may be variable in size from one another. That is, a first aperture 130 from the plurality of apertures 120 may be different in size from a second aperture 135 from the plurality of apertures 120. This may serve as an identifier for the type of hose fitting. For examples, hose fittings may come in several sizes and configurations depending on the pressure and usage requirements of the circuit. Medium and high pressure hose fittings may be similar in appearance, yet each must be properly identified for its use. The apertures in the plate 115 may vary in size to accommodate the respective hose fitting 110 and its corresponding hydraulic valve 105. This advantageously allows ease of identifying and coupling the hose fitting with the appropriate hydraulic valve. Incorrect hose fittings can result in pinhole leaks, ruptures, heat build ups, pressure drops, cavitation, and other failures.

The guiding plate 100 may be a single-piece component 165. The single piece component 165 enables ease of manufacturing and method of use. The guiding plate 100 may be manufactured through one or more of sheet stamping, single-piece injection molding, and machining. Contingent upon the material makeup, one form of manufacture may be more applicable and/or economical than others.

FIG. 4 illustrates a method of coupling a plurality of hydraulic valves 105 with a plurality of hose fittings 110 using a guiding plate 100 which may be implemented in a work machine as depicted in the various FIGURES. At step 300, the method starts with providing a guiding plate 100 with a plurality of apertures 120 corresponding to the plurality of hose fittings. At step 310, the guiding plate is oriented to align with the plurality of hydraulic valves. At step 320, the plurality of hose fittings is coupled with the plurality of hydraulic valves. Once in position, the guiding plate 100 may remain assembled with the hose assembly. This advantageously allows for ease of replacement of worn parts during services of the work machine, wherein the sequencing from identifying marks 145, and orientation of the plurality of hose fittings 110 are easily referenced.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A guiding plate for coupling a plurality of hydraulic valves with a plurality of hose fittings, the guiding plate comprising:
   a plate with a plurality of apertures corresponding to the plurality of hydraulic valves, the plate positioned over the plurality of hydraulic valves;
   an identifying mark on the plate for each of the plurality of apertures, the identifying mark indicating a sequence of coupling of each hydraulic valve from the plurality of hydraulic valves with each hose fitting from the plurality of hose fittings; and
   an orientation indent on a perimeter of the plate, the orientation indent limiting the orientation of the plate positioning over the plurality of hydraulic valves.

2. The guiding plate of claim 1, wherein the plate further comprises a notch for each aperture from the plurality of apertures, the notch indicating the direction each hose fitting is oriented.

3. The guiding plate of claim 1, wherein a first aperture from the plurality of apertures is different in size from a second aperture from the plurality of apertures.

4. The guiding plate of claim 1, wherein the guiding plate is a single-piece component.

5. The guiding plate of claim 4, wherein the guiding plate is manufactured through one or more of sheet stamping, single-piece injection molding, and machining.

6. A guiding plate for coupling a plurality of hydraulic valves with a plurality of hose fittings, the guiding plate comprising:
   a plate with a plurality of apertures corresponding to the plurality of hydraulic valves, the plate positioned over the plurality of hydraulic valve; and
   a notch for each aperture from the plurality of apertures, the notch indicating a direction each hose fitting is oriented.

7. The guiding plate of claim 6, wherein the plate further comprises:
   an identifying mark on the plate for each of the plurality of apertures, the identifying mark indicating the sequence of coupling of each hydraulic valve from the plurality of hydraulic valves with each hose fitting from the plurality of hose fittings.

8. The guiding plate of claim 6, wherein the plate further comprises:
   an orientation indent on a perimeter of the plate, the orientation indent limiting the orientation of the plate positioning over the plurality of valves.

9. The guiding plate of claim 6, wherein a first aperture from the plurality of apertures is different in size from a second aperture from the plurality of apertures.

10. The guiding plate of claim 6, wherein the guiding plate is a single-piece component.

11. The guiding plate of claim 10, wherein the guiding plate is manufactured through one or more of sheet stamping, single-piece injection molding, and machining.

12. A method of coupling a plurality of hydraulic valves with a plurality of hose fittings using a guiding plate, the method comprising:
    providing the guiding plate with a plurality of apertures corresponding to the plurality of hose fittings;
    orienting the guiding plate to align with the plurality of hydraulic valves;
    positioning the guiding plate over the plurality of hydraulic valves; and
    coupling the plurality of hose fittings with the plurality of hydraulic valves,
    wherein the guiding plate comprises an orientation indent on a perimeter of the guiding plate, the orientation indent limiting the orientation of the guiding plate when positioned over the plurality of valves.

13. A method of coupling a plurality of hydraulic valves with a plurality of hose fittings using a guiding plate, the method comprising:
    providing the guiding plate with a plurality of apertures corresponding to the plurality of hose fittings;
    orienting the guiding plate to align with the plurality of hydraulic valves;
    positioning the guiding plate over the plurality of hydraulic valves; and
    coupling the plurality of hose fittings with the plurality of hydraulic valves,
    wherein the guiding plate further comprises a notch for each aperture from the plurality of apertures, the notch indicating a direction each hose fitting is oriented.

* * * * *